March 25, 1941.　　　C. T. WALTER　　　2,236,078
FLESHING MACHINE
Filed March 1, 1939　　　2 Sheets-Sheet 1
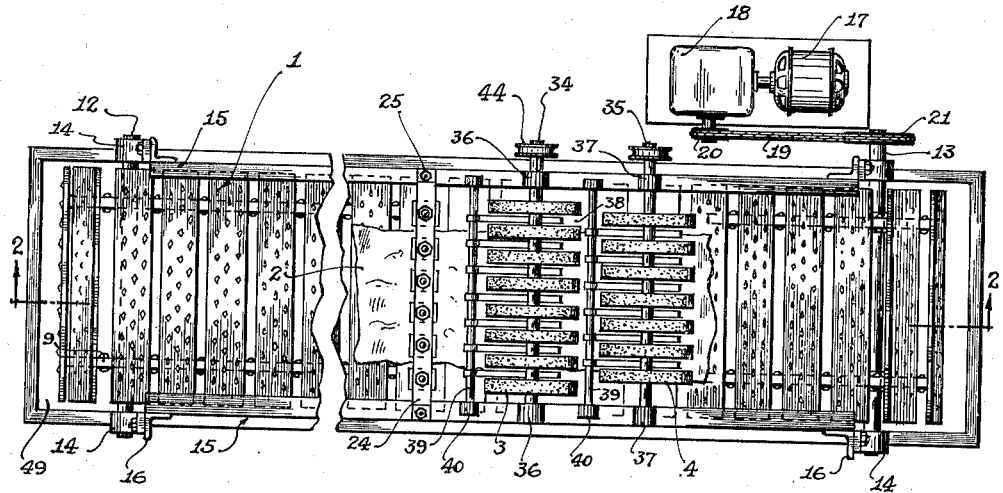
Fig. 1
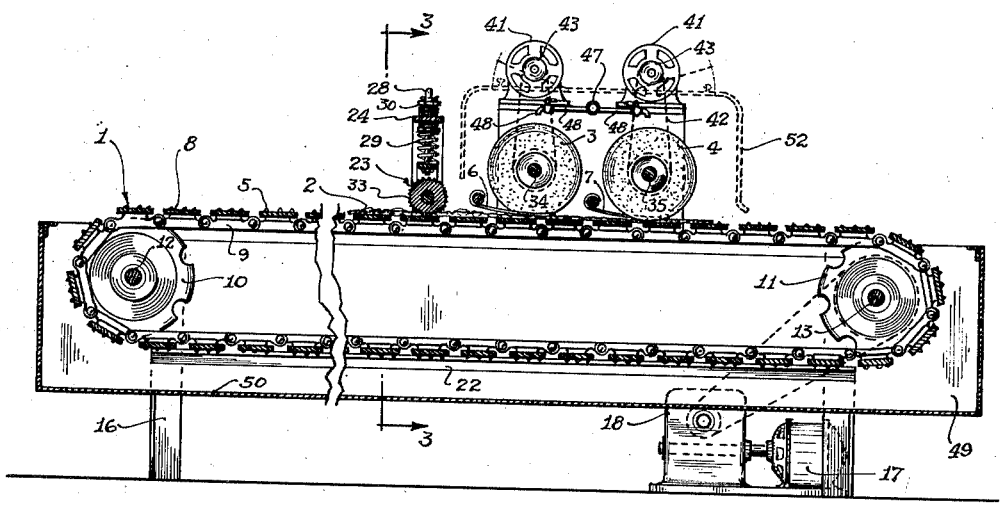
Fig. 2
ATTEST-
Norbert E Birch
Wm C. Meiser
Charles T. Walter
INVENTOR
BY 
ATTORNEY Patented Mar. 25, 1941

2,236,078

UNITED STATES PATENT OFFICE 2,236,078

FLESHING MACHINE

Charles T. Walter, Chicago, Ill., assignor to Industrial Patents Corporation, Chicago, Ill., a corporation of Delaware Application March 1, 1939, Serial No. 259,290

15 Claims. (Cl. 149—19)

This invention relates to an improved fleshing machine.

One of the objects of the invention is to provide an improved fleshing machine.

Another object of the invention is to provide automatic means for removing recoverable fats from skins and skin scraps.

Other objects of the invention will be apparent from the description and claims which follow.

The device of the present invention comprises in combination a conveying means and a fleshing means mounted relative to the conveying means.

The device requires only that the fat bearing skins be placed fat side up upon the conveying surface whence they are carried relative to the fleshing means and the recoverable fat is removed. The device is applicable within reason to skins of varying sizes and thicknesses. It is easily operated and does not require highly skilled labor.

Reference is had to the drawings in which like characters of reference are used to designate similar elements.

Figure 1 is a plan view of the device, the guard and means for driving the fleshing wheels being omitted.

Figure 2 is a side sectional view taken substantially on line 2—2 of Figure 1.

Figure 3:
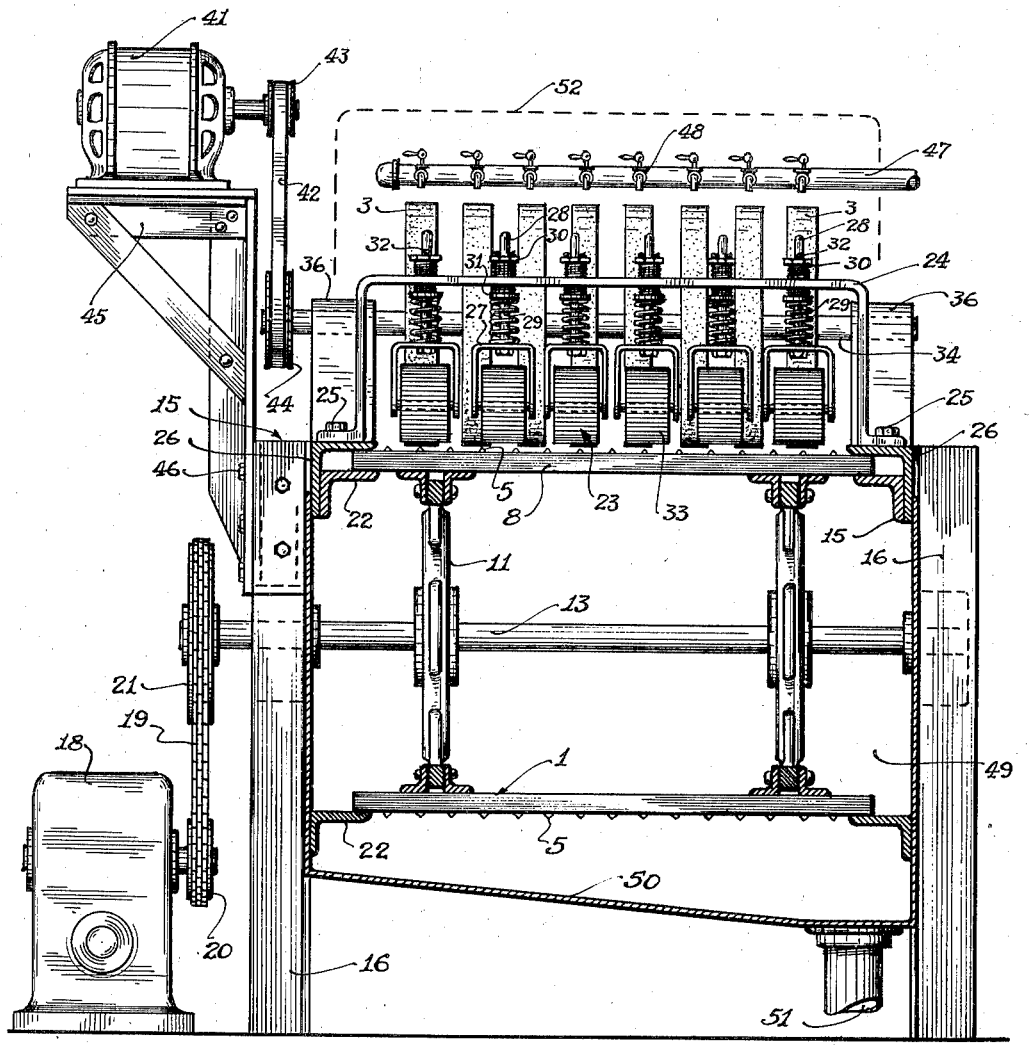
Figure 3 is an enlarged side sectional view taken substantially on line 3—3 of Figure 2.

The device comprises broadly a means including endless conveyor 1 adapted to carry continuously the skins 2 with their fat sides up relative to fleshing rollers 3 and 4 of abrasive or other suitable material, the skins 2 being firmly held at their point of contact with rollers 3 and 4 by studs 5 cooperative with presser fingers 6 and 7.

Endless conveyor 1 comprises a plurality of spaced transverse bars 8 suitably mounted upon chains 9 which in turn are carried upon idler sprocket 10 and driven sprocket 11.

Sprockets 10 and 11 respectively are pinioned to shafts 12 and 13, journaled within suitable bearings 14. Bearings 14 are rigidly secured to framework 15 supported upon standards 16. The shaft 13 is driven by power transmitted from motor 17 through the medium of gear box 18, chain 19 and sprockets 20 and 21.

As viewed in Figure 3, the upper and lower flights of conveyor 1 are shown slidably supported upon angles 22 suitably secured to standards 16.

The skins 2, before carriage to fleshing rollers 3 and 4, are firmly pressed into holding relationship with studs 5 by presser rollers 23 arranged in series in longitudinal end to end relationship transversely of conveyor 1. Rollers 23 are supported as a unit by bracket 24 rigidly secured as by bolts 25 and angles 26 to framework 15, and each of them is independently spring tensioned toward conveyor 1 through the medium of a yoke 27, shaft 28 and spring 29 adjustably secured within a suitable opening provided in bracket 24 by threaded stud 30. The spring 29 of each of the rollers 23 is compressibly secured between the yoke 27 and slidable collar 31. The shaft 28 is slidably mounted through stud 30 and is limited in its downward movement by pin 32. The surfaces of rollers 23 are longitudinally ribbed as at 33 to prevent slippage of the fat surfaces of the skins thereagainst. The provision of a series of independently movable presser rollers is found to uniformly press the skins regardless of differences of thickness of the skins carried simultaneously therebeneath.

The fleshing rollers 3 and 4, respectively, are pinioned or otherwise rigidly secured in longitudinal spaced relationship to shafts 34 and 35 journaled within suitable bearings provided within risers 36 and 37. Risers 36 and 37 are rigidly secured to framework 15.

It will be noted that the fleshing wheels 4 are aligned immediately to the rear of fleshing wheels 3 and relative to the spaces 38 intermediate the fleshing wheels 3 so that in combination the fleshing wheels 3 and 4 present a continuous fleshing surface. It will be noted also that the spaces intermediate the fleshing wheels 3 and 4 allow for mounting presser fingers 6 and 7 for pressing the skins firmly into holding relationship with studs 5 immediately at the point of contact of the skins with the fleshing wheels 3 and 4.

The presser fingers 6 and 7 are made of relatively firm but yieldable material and are rigidly secured by cross members 39, in pressible engagement with the ends of studs 5. Cross members 39 are pinioned within keepers 40 which in turn are rigidly secured to framework 15.

The shafts 34 and 35 are shown separately driven by power transmitted from a motor 41 through the medium of a belt 42 and pulleys 43 and 44. The motors 41 are mounted upon bracket 45 rigidly secured as by bolts 46 to framework 15.

Header line 47 leads from a source of hot water supply not shown and provides a branch line 48 for wetting each of the wheels 3 and 4 during operation thereof. The excess water passing from the wheels 3 and 4 also serves to carry the recovered fat through the spaces provided between conveyor bars 8 and into tank 49 provided beneath conveyor 1. The recovered fat in tank 49 is carried by sloped bottom 50 through drain opening 51 to a catch basin not shown. As shown in Figure 2 a guard plate 52 may be mounted in any suitable manner above the wheels 3 and 4 for the protection of the operator.

In operation the skins 2 are placed at random with their fat sides up upon conveyor 1. The skins placed on conveyor 1 are pressed firmly into holding relationship with studs 5 by presser rollers 23 and thereafter the skins are carried beneath the rotating fleshing rollers 3 and 4 whence the recoverable fat is removed therefrom. The skins immediately at their point of contact with rollers 3 and 4 are held firmly by the fingers 6 and 7 against the studs 5.

I claim:

1. In a fleshing machine including a conveying means, fleshing means mounted relative to the conveying means comprising a series of rotatable fleshing rollers mounted in spaced longitudinal relationship transversely of the path of movement of the conveying means and presser means intermediate each pair of fleshing rollers.

2. In a fleshing machine including a conveying means, fleshing means mounted relation to the conveying means comprising a series of rotatable fleshing rollers mounted in spaced longitudinal relationship transversely of the path of movement of the conveying means and presser means secured intermediate each pair of rollers, said presser means being adapted to secure skins against slippage against the conveyor surface of the conveying means during carriage of the skins against the fleshing rollers.

3. In a fleshing machine including a conveying means, fleshing means mounted relative to the conveying means comprising a series of rotatable fleshing rollers mounted in spaced longitudinal relationship transversely of the path of movement of the conveying means, and means including a series of presser fingers extensible intermediate the pairs of fleshing rollers, said presser fingers being adapted to press skins firmly against the conveying surface of the conveying means during carriage of the skins against the fleshing rollers.

4. In a fleshing machine including an endless conveying means, a first series and a second series of rotatable fleshing rollers, each series of rollers being mounted in spaced longitudinal relationship transversely of the path of movement of the conveying means, the second series of rollers being aligned with the spaces between the first series of rollers and to the rear of the first series of rollers.

5. In a fleshing machine including an endless conveying means, a first series and a second series of rotatable fleshing rollers, each series of rollers being mounted in spaced longitudinal relationship transversely of the path of movement of the conveying means, the second series of rollers being aligned with the spaces between the first series of rollers and to the rear of the first series of rollers and presser means intermediate each pair of each series of rollers, said presser means being adapted to secure skins firmly against slippage against the conveying surface of the conveying means during carriage of the skins against the fleshing rollers.

6. In a fleshing machine including a conveying means and a fleshing means mounted in functional relationship with the conveying means, means adapted to firmly secure skins against slippage against the conveying surface of the conveying means during carriage of the skins against the fleshing means comprising a series of upstanding studs provided in the conveying surface of the conveying means and means mounted ahead of the fleshing means for pressing the skins into holding engagement with the studs.

7. In a fleshing machine including a conveying means and fleshing means mounted relative to the conveying means comprising a series of rotatable fleshing rollers mounted in spaced longitudinal relationship transversely of the conveying means, means adapted to firmly secure skins against slippage against the conveying surface of the conveying means during carriage of the skins against the fleshing rollers comprising a series of upstanding studs provided in the conveying surface of the conveying means and a presser means mounted intermediate each pair of fleshing rollers.

8. In a fleshing machine including a conveying means and fleshing means mounted relative to the conveying means comprising a series of rotatable fleshing rollers mounted in spaced longitudinal relationship transversely of the conveying means, means adapted to firmly secure skins against slippage against the conveying surface of the conveying means during carriage of the skins against the fleshing rollers comprising a series of upstanding studs provided in the conveying surface of the conveying means and presser fingers mounted intermediate each pair of fleshing rollers and pressible toward the studs.

9. In a fleshing machine including a conveying means and fleshing means mounted relative to the conveying means comprising a series of rotatable fleshing rollers mounted in spaced longitudinal relationship transversely of the conveying means, means for holding skins relative to the conveying surface of the conveying means immediately at their point of carriage against the fleshing rollers comprising a series of upstanding studs provided in the conveying surface of the conveying means and presser means mounted intermediate each pair of fleshing rollers and pressible against the studs, and means mounted ahead of the fleshing means for pressing the skins into holding engagement with the studs.

10. In a fleshing machine including a conveying means and fleshing means mounted relative to the conveying means comprising a series of rotatable fleshing rollers mounted in spaced longitudinal relationship transversely of the conveying means, means for holding skins relative to the conveying surface of the conveying means immediately at their point of carriage against the fleshing rollers comprising a series of upstanding studs provided in the conveying surface of the conveying means and presser means mounted intermediate each pair of fleshing rollers and pressible against the studs, and means mounted ahead of the fleshing means for pressing the skins into holding engagement with the studs comprising a series of independently movable, spring tensioned presser rollers pressible against the studs.

11. In a fleshing machine including a conveying means and fleshing means mounted relative to the conveying means comprising a series of rotatable fleshing rollers mounted in spaced longitudinal relationship transversely of the conveying means, means for holding skins relative to the conveying surface of the conveying means immediately at their point of carriage against the fleshing rollers comprising a series of upstanding studs provided in the conveying surface of the conveying means and presser means mounted intermediate each pair of fleshing rollers and pressible against the studs, and means mounted ahead of the fleshing means for pressing the skins into holding engagement with the studs comprising a series of independently movable spring tensioned presser rollers pressible against the studs, said presser roller having ribbed surfaces and being mounted in longitudinal end to end relationship transversely of the conveying surface of the conveying means.

12. In a fleshing machine including an endless conveying means provided with a series of upstanding skin holding studs, means for pressing the skins into holding engagement with the studs comprising a series of presser rollers mounted in longitudinal end to end relationship transversely of the conveying means.

13. In a fleshing machine including an endless conveying means provided with a series of upstanding skin holding studs, means for pressing the skins into holding engagement with the studs comprising a series of presser rollers mounted in longitudinal end to end relationship transversely of the conveying means, each of said presser rollers being independently spring tensioned toward the conveying means.

14. In a fleshing machine including a conveying means and fleshing means mounted in functional relationship with the conveying means, means adapted to firmly secure skins against slippage against the conveying surface of the conveying means during carriage of the skins against the fleshing means comprising a series of upstanding studs provided in the conveying surface of the conveying means and means mounted ahead of the fleshing means for pressing the skins into holding engagement with the studs comprising a series of presser rollers mounted in longitudinal end to end relationship transversely of the conveying means.

15. In a fleshing machine including a conveying means and fleshing means mounted in functional relationship with the conveying means, means adapted to firmly secure skins against slippage against the conveying surface of the conveying means during carriage of the skins against the fleshing means comprising a series of upstanding studs provided in the conveying surface of the conveying means and means mounted ahead of the fleshing means for pressing the skins into holding engagement with the studs comprising a series of presser rollers mounted in longitudinal end to end relationship transversely of the conveying means, each of said presser rollers being independently spring tensioned toward the conveying means.

CHARLES T. WALTER.

CERTIFICATE OF CORRECTION.

Patent No. 2,236,078. March 25, 1941.

CHARLES T. WALTER.

It is hereby certified that error appears in the printed specification of the above numbered patent requiring correction as follows: Page 2, first column, line 29, claim 2, for the word "relation" read --relative--; line 35, claim 2, after "to" insert --firmly--; and that the said Letters Patent should be read with this correction therein that the same may conform to the record of the case in the Patent Office.

Signed and sealed this 13th day of May, A. D. 1941.

(Seal)

Henry Van Arsdale,
Acting Commissioner of Patents.